Figure 1:
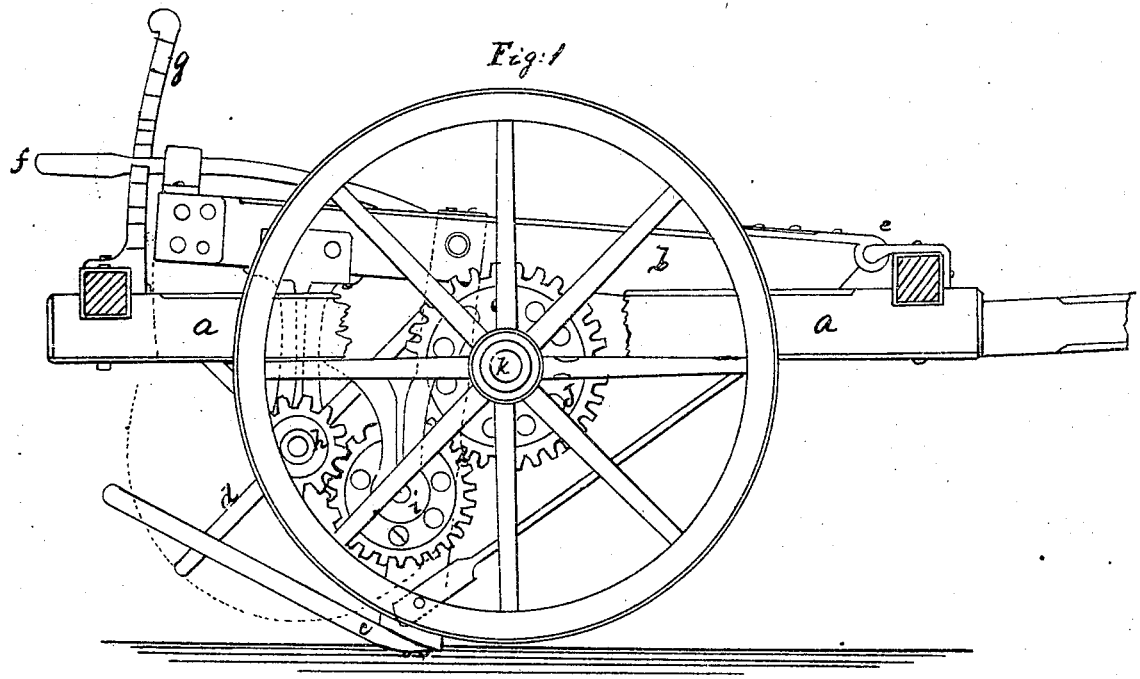
Figure 2:
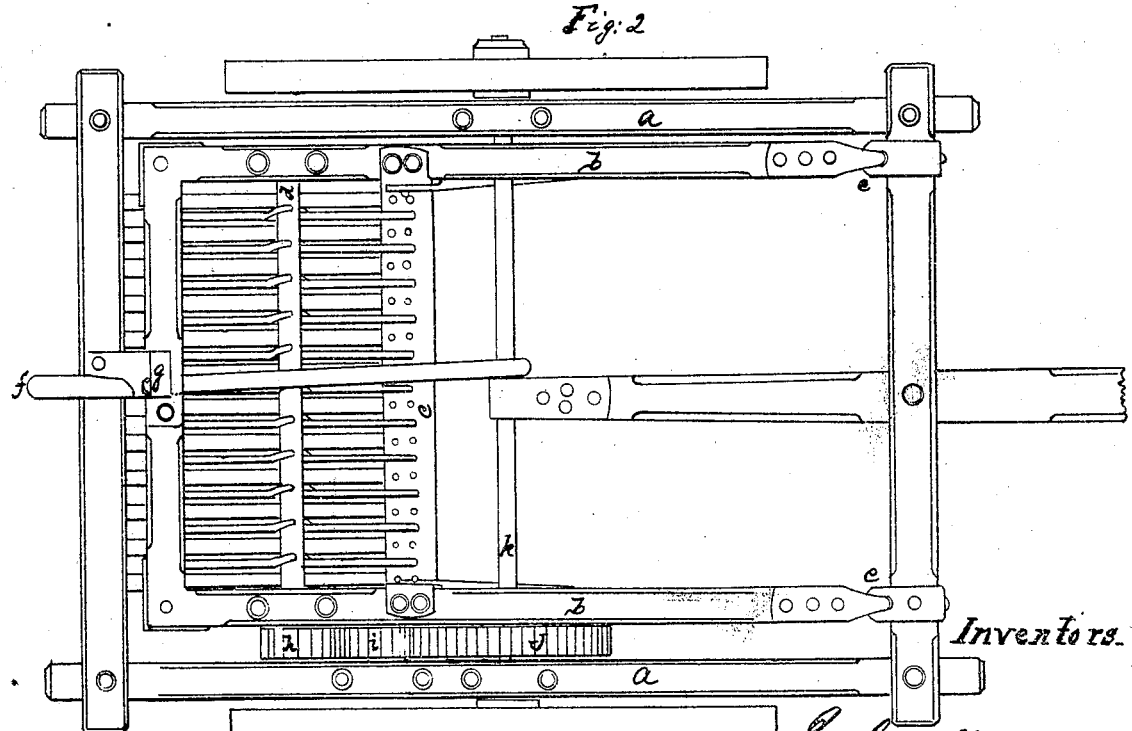

Gray & Calhoun.
Potato-Digger.

N° 73319 — Patented Jan. 14, 1868.

Witnesses:
J. E. Allison
J. Scholfield

Inventors:
John H. Gray
Charles W. Calhoun

United States Patent Office.

JOHN H. GRAY AND CHARLES W. CALHOUN, OF FLORENCE TOWNSHIP, MICHIGAN.

Letters Patent No. 73,319, dated January 14, 1868.

IMPROVEMENT IN POTATO-DIGGERS.

The Schedule referred to in these Letters Patent and making part of the same.

TO ALL WHOM IT MAY CONCERN:

Be it known that we, JOHN H. GRAY and CHARLES W. CALHOUN, of the township of Florence, county of St. Joseph, State of Michigan, have invented a new and improved Machine for Digging Potatoes. We do hereby declare that the following is a full and exact description thereof, reference being had to the accompanying drawings, and to the letters of reference marked thereon.

The nature of our invention consists in constructing a potato-digger mounted on wheels, the construction of the same being, first, an outer frame, $a\ a$, with an inner frame, $b\ b$, to which is attached the lifter or scoop, $c$, and also the revolving fork $d$. The said inner frame and attachments, being fastened to the outer frame at $e$, may be raised or lowered at pleasure by the lever or handle $f$, and held at any desired point by the notched standard $g$, the revolving fork $d$ having at the end of its shaft or axle a pinion, $h$, which, when lowered to its working position, tooths with another cogged wheel, $i$, which is driven by a driving-wheel, $j$, attached to the main axle $k$. One of the wheels on this axle is fastened firmly to the axle, acting as a driver, the opposite wheel being loose on the axle, so as to facilitate in turning around with the machine.

What we claim as our invention, and desire to secure by Letters Patent, is—

The construction of the machine, with the inner frame $b\ b$ hinged to the front end, with the scoop attached, in combination with the other devices, as shown and described.

JOHN H. GRAY,
CHARLES W. CALHOUN.

Witnesses:
    J. SCHOLFIELD,
    J. E. ALLISON.